June 13, 1967 J. W. BRIGHTMAN ETAL 3,324,919
SELF-LOCKING THREADED FASTENING DEVICES
Filed May 20, 1963 3 Sheets-Sheet 3
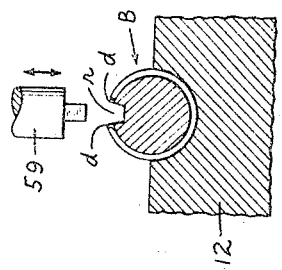
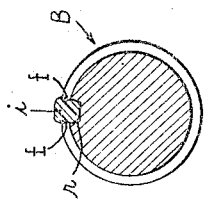
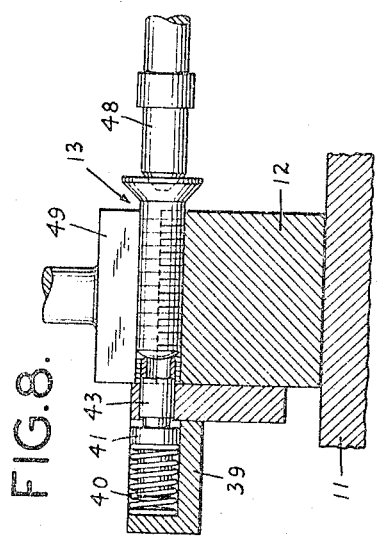
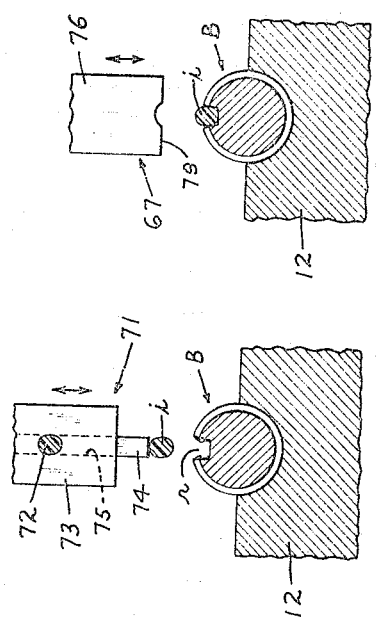
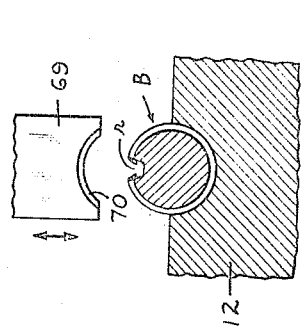
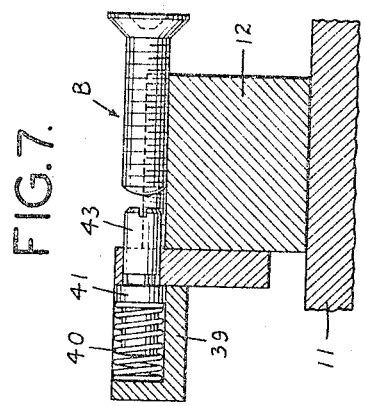
INVENTORS:
JOHN W. BRIGHTMAN
JOHN LOOP
BY
THEIR ATTORNEYS

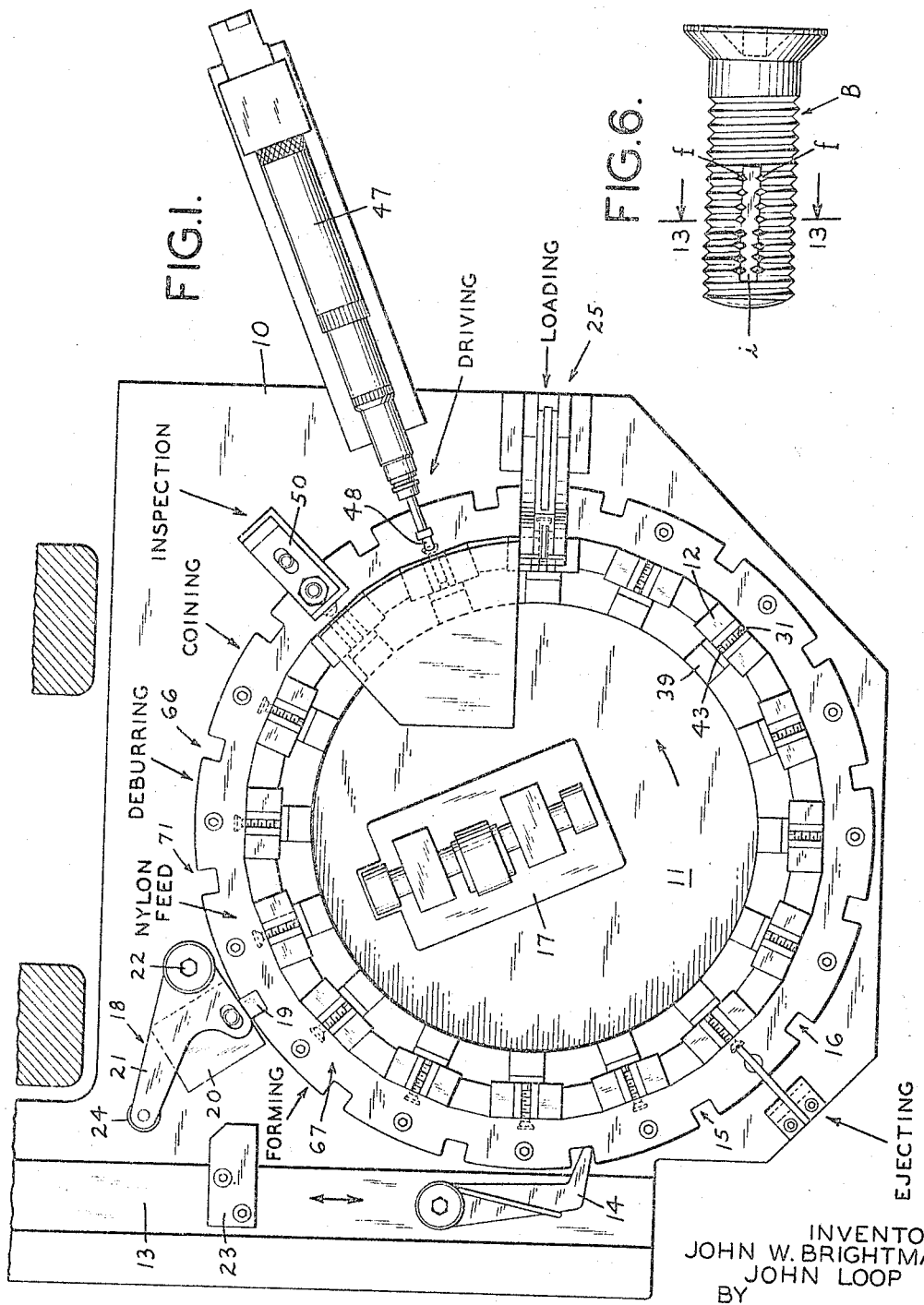

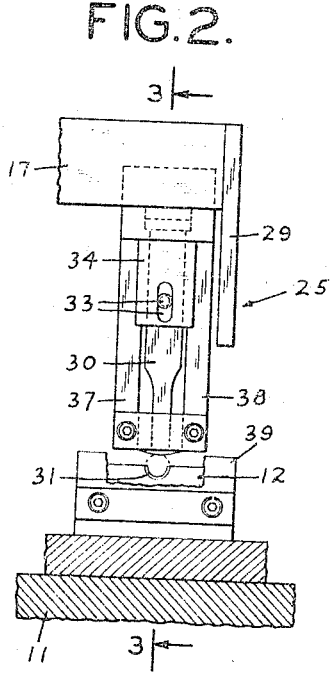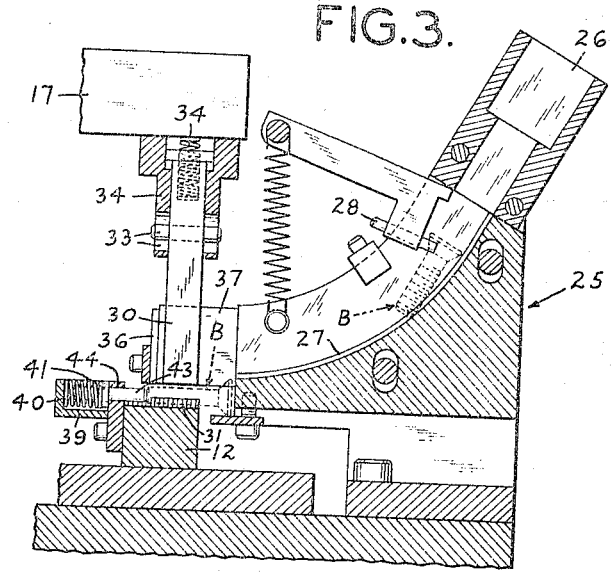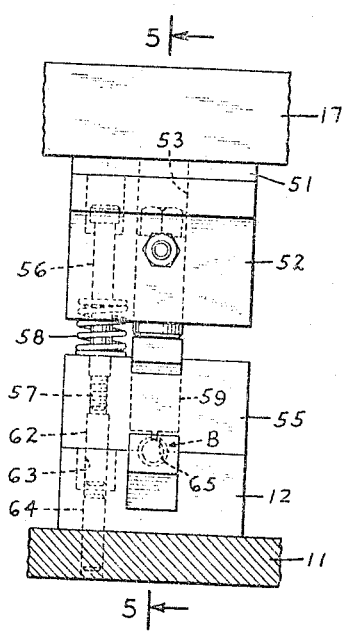

United States Patent Office 3,324,919
Patented June 13, 1967

3,324,919
SELF-LOCKING THREADED FASTENING
DEVICES
John W. Brightman, Ridgewood, and John Loop, Fair Lawn, N.J., assignors, by mesne assignments, to United Shoe Machinery Corporation, Boston, Mass., a corporation of New Jersey
Filed May 20, 1963, Ser. No. 281,696
1 Claim. (Cl. 151—7)

This invention relates to self-locking threaded fastening devices and methods and apparatus for making such devices, and more particularly to improvements in threaded fastening devices having an elongated insert strip of resilient plastic material therein serving as a locking element and to methods and apparatus for punching and inserting such strip inserts in the fastening devices.

Male threaded fastening devices such as bolts, screws and the like have been provided heretofore with elongated strips of resilient plastic material such as vulcanized fiber, nylon and the like, which serves to retain the fastening device in a complementally threaded member. Usually an elongated slot or recess is formed in the male fastening element by means of a milling cutter which enters the end of the fastening device, hereinafter referred to generally as a screw, and is advanced along the screw to form a recess of a desired length. The slot so formed has one open end and a slanting closed end corresponding generally to the curvature of the cutter. It has been proposed also heretofore to plunge-mill a slot or recess in a screw thereby providing the recess with closed opposite ends which nevertheless are inclined due to the shape of the milling cutter.

Various proposals have been made heretofore also for inserting the strip of resilient plastic into the slot so formed. In some prior operations, an insert strip of greater width than the slot is forced into the slot, thereby causing the crests of the threads along the edges of the slot to plow into the sides of the insert and cause portions thereof to be displaced into the valleys of the threads. In other operations, it has been proposed to provide an insert which is narrower than the slot, but after being introduced into the slot it is compressed into frictional engagement with the sides and bottom of the slot. In still another operation, the insert is inserted into the slot and the bolt is then subjected to a thread-rolling operation which bends the crests of the threads adjacent the slot inwardly, clamping the insert in the slot.

Each of the above methods, while in many instances providing satisfactory fastening devices has, in fact, certain deficiencies which renders it somewhat less than fully satisfactory.

In the fastening device in which the insert is expanded into contact with the walls of the slot, very little strip retention is available and inserts frequently are lost completely from the screws. Moreover, the insert can be readily forced out of the slot in an endwise direction as the screw is threaded into a complementary threaded member.

In the type of bolt in which the insert is forced into the slot with resulting plowing of material from the edges of the insert, a more effective retention of the insert is achieved but at the expense of greater irregularity in the torque required to apply and remove the screw. Moreover, due to the fact that the plastic material does not in fact interlock with the slot to retain it against radial displacement, it is easy to remove the strip, either intentionally or inadvertently, with the resulting loss of locking action. Moreover, inasmuch as the slot for receiving the insert has at least one slanting end and may be open at one end and slanting at the other, when the screw is inserted into a complemental fastening device, the plastic flow of the material has a tendency to cause it to slip endwise of the slot so that the trailing end of the insert projects from the slot and may be sheared off.

In that form of strip insert device in which the threads are subjected to a thread-rolling operation, the entire threads adjacent to the slot or recess are collapsed inwardly by the rolling operation for the reason that the plastic insert cannot support the forces created by the thread-rolling process, and the slot is substantially closed and many rejects occur.

In accordance with the present invention, an improved strip insert type of threaded fastening device is provided together with an improved apparatus and method for making it which overcome the disadvantages pointed out above. More particularly, the new fastening device is manufactured by means of a closely related and precisely controllable sequence of steps which include the punching or coining of a recess in the threaded fastening device, e.g. a screw, extending lengthwise thereof followed by a thread-forming operation which restores the screw to a desired gauge size or a predetermined slightly out-of-round condition and removes or deflects any burrs which were formed during the punching operation into the recess where they aid in securing an insert from longitudinal movement therein. In order to mantain the proper dimensions of the insert and the resulting locking torque of the screw, the insert is introduced into the recess in a form initially narrower than the recess so as to avoid shearing away of part of the insert and then is expanded by impact into tight engagement with the bottom and sides as well as the ends of the recess. Thereafter, the screw is subjected to a staking operation in which the crests of the threads along the edges of the recess are flattened and bent in slightly to embed them into the sides of the insert and simultaneously shape the remainder of the threads adjacent to the portion staked so that the completed screw is of proper dimensions and gauge size. In this last step, some of the insert material is forced over the flattened crests of the threads.

In forming the punched recess, a punch having sharp corners preferably is used. Moreover, the recess is punched so that at least the innermost longitudinal end intersects the crest of a thread so that an abutment wall is provided to aid in preventing endwise shifting of the insert as the screw containing the insert is threaded into a complemental threaded element.

Inasmuch as the above described process and the apparatus for practicing it can be operated within close manufacturing tolerances, the size of the insert with relation to the size of the recess can be controlled closely and accurately thereby assuring substantially the same locking torque in all screws of a given size. Moreover, due to the nature of the recess, i.e., a recess having closed ends, endwise shifting of the insert is kept to a minimum and the crests of the threads embedded in the sides of the insert preclude both endwise shifting and outward movement of the insert.

Products of the type embodying the present invention, therefore, have excellent locking torque, few if any rejects result from the manufacturing operation, and few if any of the screws lose the inserts therefrom or have the inserts displaced lengthwise during insertion into complementary threaded members.

For a better understanding of the present invention, reference may be had to the accompanying drawings, in which FIGURE 1 is a plan view of a typical apparatus for manufacturing strip-type threaded fastening devices embodying the invention, portions of the apparatus being omitted to disclose the features thereof;

FIGURE 2 is a view in end elevation of the fastener feeding device for the apparatus;

FIGURE 3 is a view in section taken on line 3—3 of FIGURE 2;

FIGURE 4 is a fragmentary front elevational view of a portion of the apparatus by means of which a recess or slot is punched in the fastening device;

FIGURE 5 is a view in section taken on line 5—5 of FIGURE 4;

FIGURE 6 is a plan view of a screw embodying the present invention;

FIGURE 7 in a view in cross-section of a device for positioning the screw in the inserting apparatus;

FIGURE 8 is a view in section showing the positioning apparatus and illustrating schematically the manner in which the screw is mounted therein;

FIGURES 9, 10, 11 and 12 are schematic illustrations of the procedural steps involved in the formation of the recess and insertion of an insert into the screw; and FIG. 13 is an enlarged view in cross-section of a finished screw embodying the present invention.

In a typical apparatus for practicing the invention and as illustrated schematically in FIGURES 1 to 5, the apparatus includes a supporting base 10 on which is mounted for step by step rotation a worktable 11 having mounted around its periphery of a plurality of fixtures 12, each of which is adapted to receive a threaded fastening device represented herein schematically as a Phillips head machine screw B.

The worktable 11 is rotated intermittently and step by step by means of a reciprocating slide member 13 having a spring biased pawl 14 thereon engageable successively in notches 15, 16, etc. in the rim of the worktable. Reciprocation of the slide member 13 in the direction of the arrows thereon is accomplished in timed relation to a punch press cross head 17 mounted for vertical reciprocation above the worktable 11. The head 17 can be reciprocated in any suitable way, such as for example by means of a crank shaft and connecting rod, or a mechanism such as that shown in the Borner Patent No. 2,779,039 or the MacBlane Patent No. 2,643,403. Suffice it to say that the cross head 17 is moved toward the worktable 11 while the latter is stationary and the worktable is rotated one step during upward movement of the head 17. In order to assure accurate positioning of the worktable a table latch 18 is provided which includes a tooth 19 carried on a slide block 20 which is moved inwardly and outwardly by means of a bellcrank 21 mounted on a pivot 22 on the frame 10. An actuating bar 23 on the slide member 13 engages a roller 24 on the bellcrank to rock it and withdraw the locking tooth 19 upon upward movement of the slide as viewed in FIGURE 1 so as to release the table and allow it to be turned one step by engagement of the pawl 14 in a notch 15, 16, etc. During downward movement of the slide 13. During such movement, the tool 19 will slide along the surface of the worktable and will enter a notch 15, 16, etc. when the next adjacent notch moves into alignment with the tooth. In this way, accurate positioning of the table and the screws B therein for the various operations thereon is assured.

Referring now to FIGURES 2 and 3, the screws B are introduced one by one into the fixtures 12 by means of a loading device 25 at the station identified by the legend "load" in FIGURE 1. The loading device may be of any suitable or known type and does not form a part of the present invention. As illustrated, it includes a tubular portion 26 to which the screws are supplied from a hopper (not shown) and a curved chute portion 27 for directing the screws endwise into the fixture 12. A rockable stop member 28 is provided which is tripped by means of an arm 29 on the cross head 17 to release one screw into each fixture 12 as they pass successively by the loading device.

The cross head 17 also includes a spring biased plunger 30 which presses the screw B downwardly into a semi-cylindrical threaded recess 31 in the top of each fixture 12. As best shown in FIGURES 2 and 3, the plunger 30 is slidably guided by means of a pin and slot connection 33 in a tubular sleeve 34 mounted on the underside of the cross head 17. A spring 34 is interposed between the cross head and the upper end of the plunger 30. The lower end of the plunger is further guided by means of a guide plate 36 carried by side members 37 and 38 extending from the shoe portion 27.

Means are also provided with positioning the screw axially with respect to the fixture 12 for purposes which will become apparent. To that end, each fixture carries a casing 39 mounted on the inner side of the fixture and containing a spring 40 which bears against a head 41 on a positioning pin 43 which is slidably mounted in an opening 44 in the upper wall of the casing 39. The screw B engages the end of the pin 43 and thereby is positioned preliminarily.

Inasmuch as precise axial location of the screw is highly desirable in order that a locking insert will be properly located between the ends of the screw, the fixture carrying a screw is next transported to the station identified by the legend "drive" in FIGURE 1 where the screw is positioned in the fixture. This operation is accomplished by means of a power screwdriver 47 mounted on the frame 10 and having a blade 48 best shown in FIGURE 8 complemental to the kerf in the screw B. Upon operation of the screwdriver, the screw is turned and is threaded lengthwise along the fixture 12 as shown in FIGURES 7 and 8, being held in position by means of a holddown member 49 which is carried by the cross head 17. In this way, the screw is advanced against the end of the pin 43 compressing the spring 40 and bringing the head of the screw up against the edge of the fixture. The combination of the pressure of the spring and the engagement of the screw with the threads in the fixture is sufficient to retain the screw tightly in position and against rotation in either direction. The next stage of the operation is that of inspection where the positioning of the screw is determined by means of a gauge plate 50 carried by the support 10. If the screw is not inserted sufficiently far, it is knocked out of the fixture by contact with the gauge plate.

Subsequent to inspection, a recess or slot is punched in the screw as illustrated more particularly in FIGURES 4, 5 and 9. A suitable form of punch for punching or staking the screw includes a base member 51 mounted on the underside of the cross head 17 and including a downwardly extending block 52 having an internally threaded socket 53 which receives a screw threaded stop member 54. Also carried by the support member 51 is a lower clamping block 55 which is supported by means of a headed bolt 56 slidably mounted in the block 52 and having its inner end 57 threaded into the block 55. A spring 58 is interposed between the blocks 52 and 55, thereby allowing relative movement between the upper block 52 and the lower block 55. Slidably mounted in the lower block 55 is a coining punch 59 having an enlarged head 60 at its upper end for engagement by means of the screw threaded member 54 and having a narrow punching rib 61 at its lower end by means of which the slot or recess is formed in the screw B. To assure alignment between the punch 59 and the screw B, the block 55 is provided with a positioning pin 62 which is engageable in a recess 63 in the upper surface of the fixture 12. Fixture 12 is further positioned with respect to the worktable by means of an aligning pin 64, as shown in FIGURE 4. When the cross-head 17 moves downwardly, the block 55 will engage the screw B and will receive it in the semi-cylindrical recess 65 in the undersurface of the block. Continued downward movement of the cross-head 17 will bring the threaded member 54 into engagement with the head 60 of the punch and will force the punching rib 61 into the screw and thereby form a recess *r* therein. In punching operations of the type described, the sides of the recess formed are not precisely parallel due to flow of metal but instead are somewhat tapered or converging as shown in exaggerated fashion in FIGURES 9 and 10. Moreover, the screw is deformed slightly to a somewhat oval shape with the recess r disposed on the minor dimension of the oval. The deformation is slight, e.g. on the order of .003 inch. Upward movement of the cross-head will withdraw the punch and the positioning block, allowing the next fixture and a screw therein to move beneath the punch. Adjustment of the threaded member 54 enables the depth of the recess to be controlled. Moreover, by accurately positioning the screw B in the fixture, the radially outer edge of the punch can intersect a thread at its crest-line thereby forming a perpendicular end wall in the recess, even when the recess is quite shallow, e.g., its bottom is in the plane of the roots of the threads interrupted by the recss.

Similar punching devices are arranged at the deburring and forming stages 66 and 67 (FIG. 1) where further operations are conducted on the screw as will be described hereinafter.

Referring now to FIGURES 9 and 10, when the punch 59, illustrated schematically therein, punches a recess r in the screw B, metal is displaced and sheared with the result that the threads adjacent the recess r are deformed as at d in FIGURE 9. Also burrs are formed between the threads. These deformities and burrs render the screws misshapen so that they will not fit the appropriate thread gauges and thus are not satisfactory. The screw is subjected to a second coining operation at the deburring stage 66. The deburring device is a thread-form type of female punch 69. In this way, the threads around the recess r are reshaped either to gauge dimensions or to a predetermined out-of-round shape, the purpose of which is explained hereinafter, and the former burrs that were present are deflected inwardly along the thread surfaces into the recess r.

The next step in the operation is the introduction of a resilient plastic insert into the recess r at the working stage 71 identified as "nylon feed" in FIGURE 1 and illustrated schematically in FIGURE 11. The apparatus for introducing the insert into the recess r may be of any suitable type, such as for example the strip cutting and inserting device disclosed in the Beuter et al. U.S. application Serial No. 91,811 filed February 27, 1961, now abandoned. In this device, a rod 72 of suitable plastic such as nylon is fed endwise into a fixture 73 and the leading end portion thereof is sheared off by means of a reciprocating blade 74 mounted on the cross-head 17 which forces the severed portion forming an insert through a narrow die opening 75 and compresses it to a transverse dimension narrower than the recess r. Continued downward movement of the blade 74 pushes the insert without substantial shearing or abrasion into the recess r, this action being facilitated by the outwardly diverging walls of the recess, and then compresses the insert against the bottom of the recess and expands it laterally into tight frictional engagement with the bottom, the side walls and ends of the recess, and the surface projections produced by the deburring operation. The screw is given a final treatment to assure the proper retention of the insert therein and to increase locking torque at the forming stage 67 which is also illustrated schematically in FIGURE 12 of the drawing. At this stage, a flat punch 76 with an open portion 79 thereon accomplishes the following operations of the screw B. As the punch comes down with the cross-head 17, staking portions 77 and 78, it flattens narrow portions of the crest of the thread to form small flats f thereon and deflects the crests inwardly into indenting relation or overlapping relation to the insert i, depending upon the extent of projection of the insert from the slot. The claws or teeth formed by flattening the crests of the threads dig into the insert and retain it securely against outward movement and aid in retaining it against the creeping or endwise movement in the recess.

It has been found further that when the screw is staked and the threads are reformed at the forming stage, the insert i, especially if formed of a resilient plastic material such as nylon, has a tendency to flow over and at leas partially fill the flats f, thereby providing additional contact with a complementary threaded member and improving measureably the overall locking torque of the screw While the screw illustrated in FIGURES 6 and 13 includes an insert having an outer surface of substantially smooth contour from end to end, and is substantially coplanar with the crests of the threds on the opposite sides of the recess r, the forming punch 79 may also be provided with thread-forming portions in the staking area 79 to form partial threads in the outer surface of the insert.

To further aid in eliminating endwise movement of the insert, the punch 30 may be provided with serrations on its lower edge to form a serrated bottom in the recess to which the insert is conformed by the action of the punch in introducing and compressing the insert into the recess.

As indicated above, a screw having an oval cross-section of controlled dimensions has certain advantages over a screw of circular cross-section. The oval screw is formed with a major diameter of the oval at a right angle to the location of the locking strip element. Consequently, when the screw is engaged with a round mating thread, the contact surface opposite the strip element is not diametrically opposite the strip but is shifted to a greater area or two areas more nearly at right angles to the radius determined by the location of the strip. Therefore, the reaction loads at these areas are increased—due to the geometry—which is turn increases the torque caused by the thrust of the strip.

A problem frequently encountered in the use of the self-locking nuts and bolts is the lack of adequate locking ability when the mating thread element is off round. The out-of-round condition is frequently encountered in service, particular in commercial grade nuts and tapped holes. This out-of-round condition may be caused by clamping forces during drilling or tapping operations, or it may be caused by strain relaxation after the holes have been drilled and tapped. Whatever its cause, the effects of such oval-shaped holes is deleterious to locking bolts, since the locking element is excessively compressed during rotation past the "low" mating points or maximum engagement and the locking element may not bear sufficiently against the mating thread a quarter of turn later at the "high" points or minimum engagement.

While one not skilled in the art might assume that there is sufficient locking effect for the unit at the maximum engagement points to prevent vibration-induced rotation of nut or bolt, the fact is that it is the static frictional torque which is required to prevent vibration-caused unlocking of mating thread. If the locking element is engaged at the minimum engagement with insufficient locking torque to prevent initial rotation, the moving frictional forces known as "prevailing torque" which ensue are lower than the original static torques and the nut or bolt will continue to rotate from the vibrational forces past the low points of maximum interference.

In this invention, a simple means has been devised to increase the degree of interference between the locking element at the points of minimum interference and to reduce the degree of interference at the points of maximum interference by slight deformation of the threads of the screw containing the locking element so that the diameter of the screw is at a maximum approximately 90° from the location of the insert, and at a minimum in the plane of the insert cross-section.

When the insert is opposite a point of maximum interference, the screw rests against the bottom of the mating thread, but when the screw is turned 90° so that the insert is at a point of minimum interference, the sides of the screw ride against the sides of the mating thread so as to bring the insert into closer engagement. An effect is created on the locking torque which results in more nearly uniform torque as the screw is rotated in the elliptical mating thread.

In other words, when the minor transverse axes of the deformed or slightly oval screw and an out-of-round threaded hole in a female fastener are aligned, the zone of maximum contact between them is 180° from the insert. When the minor transverse axes of the screw and hole in the female fastener are inclined or perpendicular, the maximum contact between the screw and the threads in the hole is at two zones less than 180° displaced from the insert and the screw tends to be displaced along the long transverse axis of the out-of-round hole in the direction of the insert, thereby maintaining a more uniform compression of the insert regardless of the rotated relation of the screw in the wall.

It will be understood that the above operations can be conducted on many different types of threaded fastening devices including bolts, screws, nuts, turnbuckle elements, couplings, and in fact almost any threaded fastening element to impart self-locking characteristics thereto. The term "screw" as used herein is intended to include all such fastening devices.

While nylon is mentioned as a suitable insert material, other resilient plastics can be used satisfactorily.

The type of apparatus for practicing the invention can be modified considerably. For example, a reciprocating fixture for carrying the screws past the various manufacturing stages can be used instead of a rotary worktable. Accordingly, the forms of the invention disclosed herein should be considered as illustrative and the invention should not be considered as limited, other than as defined in the following claims.

We claim:

A self-locking fastener comprising a threaded fastening device having an elongated recess of substantially uniform depth extending lengthwise thereof, and interrupting the threads on said device, and having closed opposite ends spaced inwardly from the ends of said device, a resilient insert in said recess said interrupted threads adjacent to said recess having their crests flattened and deflected radially inwardly adjacent to said recess and engaging and embedded in said insert to retain it against endwise and outward movement relative to said recess, wherein said threaded fastening device is slightly oval in cross-section in the region of recess and said recess is located on the minor axis of said fastening device whereby in out-of-round threaded holes the contact area of the fastening device against a female thread on the minor axis opposite the insert is shifted from said minor axis to angles of less than 180° on both sides of said minor axis so as to set up additional reaction forces when the minor axis of the screw is in the plane of the major axis of the hole producing a more uniform locking torque force.

References Cited

UNITED STATES PATENTS

| | | | |
|---|---|---|---|
| 2,409,638 | 10/1946 | Lyon | 151—7 |
| 2,533,894 | 12/1950 | Podell | 151—7 |
| 2,608,229 | 8/1952 | Brutus | 151—7 |
| 2,740,973 | 4/1956 | Borner | 10—2 |
| 2,980,928 | 4/1961 | Wallace | 10—2 |
| 3,020,570 | 2/1962 | Wallace | 10—10 |
| 3,076,208 | 2/1963 | Moore | 10—10 |
| 3,079,968 | 3/1963 | Buckley | 151—7 |

CARL W. TOMLIN, *Primary Examiner.*

R. S. BRITTS, C. B. ELDERKIN, *Assistant Examiners.*